US010929189B2

(12) United States Patent
Palermo et al.

(10) Patent No.: US 10,929,189 B2
(45) Date of Patent: Feb. 23, 2021

(54) MOBILE EDGE COMPUTE DYNAMIC ACCELERATION ASSIGNMENT

(71) Applicant: Intel Corporation, Santa Clara, CA (US)

(72) Inventors: Stephen T. Palermo, Chandler, AZ (US); Soo Jin Tan, Shanghai (CN); Valerie Young, Portland, OR (US); Hassnaa Moustafa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/754,517

(22) PCT Filed: Oct. 21, 2015

(86) PCT No.: PCT/CN2015/092416
§ 371 (c)(1),
(2) Date: Feb. 22, 2018

(87) PCT Pub. No.: WO2017/066936
PCT Pub. Date: Apr. 27, 2017

(65) Prior Publication Data
US 2018/0246768 A1 Aug. 30, 2018

(51) Int. Cl.
*G06F 9/46* (2006.01)
*G06F 9/50* (2006.01)
(Continued)

(52) U.S. Cl.
CPC ........ *G06F 9/5044* (2013.01); *G06F 9/45558* (2013.01); *G06F 9/4881* (2013.01);
(Continued)

(58) Field of Classification Search
CPC combination set(s) only.
See application file for complete search history.

(56) References Cited

U.S. PATENT DOCUMENTS 9,983,857 B2 * 5/2018 Powers ............... G06F 9/45504
2012/0002546 A1    1/2012 Sundararaman et al.
(Continued)

FOREIGN PATENT DOCUMENTS

CN         1523844        8/2004
CN         100484119      4/2009
(Continued)

OTHER PUBLICATIONS

"International Application Serial No. PCT/CN2015/092416, International Search Report dated Jul. 15, 2016", 5 pgs.
(Continued)

*Primary Examiner* — Diem K Cao
(74) *Attorney, Agent, or Firm* — Schwegman Lundberg & Woessner, P.A.

(57) ABSTRACT

Embodiments of a system and method for dynamic hardware acceleration are generally described herein. A method may include identifying a candidate task from a plurality of tasks executing in an operating environment, the operating environment within a hardware enclosure, the candidate task amenable to hardware optimization, instantiating, in response to identifying the candidate task, a hardware component in the operating environment to perform hardware optimization for the task, the hardware component being previously inaccessible to the operating environment, and executing, by the operating environment, a class of tasks amenable to the hardware optimization on the hardware component.

12 Claims, 5 Drawing Sheets

(51) Int. Cl.
*G06F 9/455* (2018.01)
*G06F 9/48* (2006.01)
*H04L 29/08* (2006.01)
*H04L 12/26* (2006.01)
*H04L 12/66* (2006.01)

(52) U.S. Cl.
CPC .......... *G06F 9/5027* (2013.01); *G06F 9/5072* (2013.01); *H04L 67/12* (2013.01); *G06F 2009/45595* (2013.01); *H04L 12/66* (2013.01); *H04L 43/0817* (2013.01); *H04L 67/16* (2013.01)

(56) References Cited

U.S. PATENT DOCUMENTS

| | | |
|---|---|---|
| 2012/0154412 A1 | 6/2012 | Harney et al. |
| 2013/0152099 A1* | 6/2013 | Bass .................... G06F 9/5027 718/103 |
| 2014/0189312 A1 | 7/2014 | Tan |
| 2014/0189862 A1 | 7/2014 | Kruglick |
| 2014/0215424 A1 | 7/2014 | Fine et al. |
| 2016/0077870 A1* | 3/2016 | Pho ....................... G06F 9/4881 718/103 |
| 2016/0210167 A1* | 7/2016 | Bolic .................. G06F 9/45558 |
| 2016/0323143 A1* | 11/2016 | Kim ...................... G06F 9/4411 |

FOREIGN PATENT DOCUMENTS

| | | |
|---|---|---|
| CN | 103310301 | 9/2013 |
| CN | 103617191 A | 3/2014 |
| CN | 104200406 | 12/2014 |
| CN | 104253701 A | 12/2014 |
| CN | 108141407 | 6/2018 |
| JP | 2012133778 A | 7/2012 |
| JP | 2014500535 A | 1/2014 |
| JP | 6388896 | 8/2018 |
| WO | WO-2014182900 A1 | 11/2014 |
| WO | WO-2015056248 A1 | 4/2015 |
| WO | WO-2017066936 A1 | 4/2017 |

OTHER PUBLICATIONS

"International Application Serial No. PCT/CN2015/092416, Written Opinion dated Jul. 15, 2016", 4 pgs.

"Japanese Application Serial No. 2016-204443, Office Action dated Sep. 5, 2017", w/ English translation, 16 pgs.

"Japanese Application Serial No. 2016-204443, Response filed Feb. 5, 2018 to Office Action dated Sep. 5, 2017", w/ claims in English, 17 pgs.

"European Application Serial No. 15906454.2, Extended European Search Report dated Mar. 27, 2019", 10 pgs.

Kumar, Sharad, "A Systems Approach to Verification using Hardware", Acceleration IEEE Xplore Digital Library 04, (Aug. 2010).

"European Application Serial No. 15906454.2, Response filed Oct. 22, 2019 to Extended European Search Report dated Mar. 27, 2019", 24 pgs.

"European Application Serial No. 15906454.2, Communication Pursuant to Article 94(3) EPC dated Nov. 29, 2019", 11 pgs.

"European Application Serial No. 15906454.2, Response filed Apr. 9, 2020 to Communication Pursuant to Article 94(3) EPC dated Nov. 29, 2019", 20 pgs.

"Chinese Application Serial No. 201580083256.6, Office Action dated May 28, 2020", w English translation, 21 pgs.

"European Application Serial No. 15906454.2, Communication Pursuant to Article 94(3) EPC dated Aug. 20, 2020", 6 pgs.

* cited by examiner

MOBILE EDGE COMPUTE DYNAMIC ACCELERATION ASSIGNMENT

CLAIM OF PRIORITY

This patent application is a U.S. National Stage Application under 35 U.S.C. 371 from International Application No. PCT/CN2015/092416, filed Oct. 21, 2015, published as WO 2017/066936, which is incorporated herein by reference.

TECHNICAL FIELD

Embodiments pertain to edge computing. Some embodiments relate to processing tasks at edge devices when enabling Internet of Things (IoT) services.

BACKGROUND

IoT devices are devices in a network that often include sensors and limited computing power. IoT devices have broad applicability and each IoT device is typically specialized to its particular use and environment. IoT devices are used in homes, businesses, industrial applications, vehicles, security, optimization, and improving connectivity. The IoT devices communicate with each other directly and communicate with other networks and the broader internet through gateways.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A present shift from cloud computing to edge computing for IoT services is driven by both the need to have more processing power closer to the IoT devices and the reduced cost of providing the proximately located compute capabilities. Standards, such as those of the European Telecommunications Standards Institute (ETSI) for Mobile edge computing (MEC) are addressing this paradigm shift by aiming to offer a different services environment and cloud-computing capabilities within the Radio Access Network (RAN) in close proximity to wireless and mobile subscribers. MEC may allow better performance for IoT services and applications because of the increased responsiveness between the edge and IoT devices over cloud based processing. However, as the trend for IoT data storage, processing and analytics moves toward the network edge, current systems often fail to optimize MEC resources supporting IoT services.

Devices, methods, and systems are discussed herein that optimize IoT traffic aggregation, processing, and service provisioning by dynamically assigning needs-based hardware acceleration to the particular Mobile edge computing (MEC) server hosting IoT gateways or to the local gateways responsible for IoT traffic aggregation, processing, and storage. These devices, methods, and techniques provide dynamic processing and provide for processing near the edge (i.e., closer to IoT data sources), which in turn optimizes network resources. The devices, methods, and systems that are discussed provide resource optimizing edge-computing capacity (e.g., IoT traffic aggregation, processing, and service provisioning) by dynamically assigning needs-based hardware acceleration to particular edge-compute gateways or co-located MEC Servers edge computing gateways. The gateways may be arranged hierarchically to reduce latencies between edge compute servers or gateways and IoT devices.

In an example, an IoT gateway is an edge network entity with compute and storage capabilities, and with a role of IoT data aggregation and connection to the cloud. An IoT gateway may run data analytics in a partial or full manner depending on processing capabilities. The IoT gateway may be located at different levels of the network depending on the IoT network density, deployment requirements and application needs. In an example, the system includes a plurality of IoT gateways implementing edge-based computing that communicate either between the IoT gateways or the IoT device arranged geographically to reduce latency between the gateways or between the gateway and the IoT device.

Figure 1:
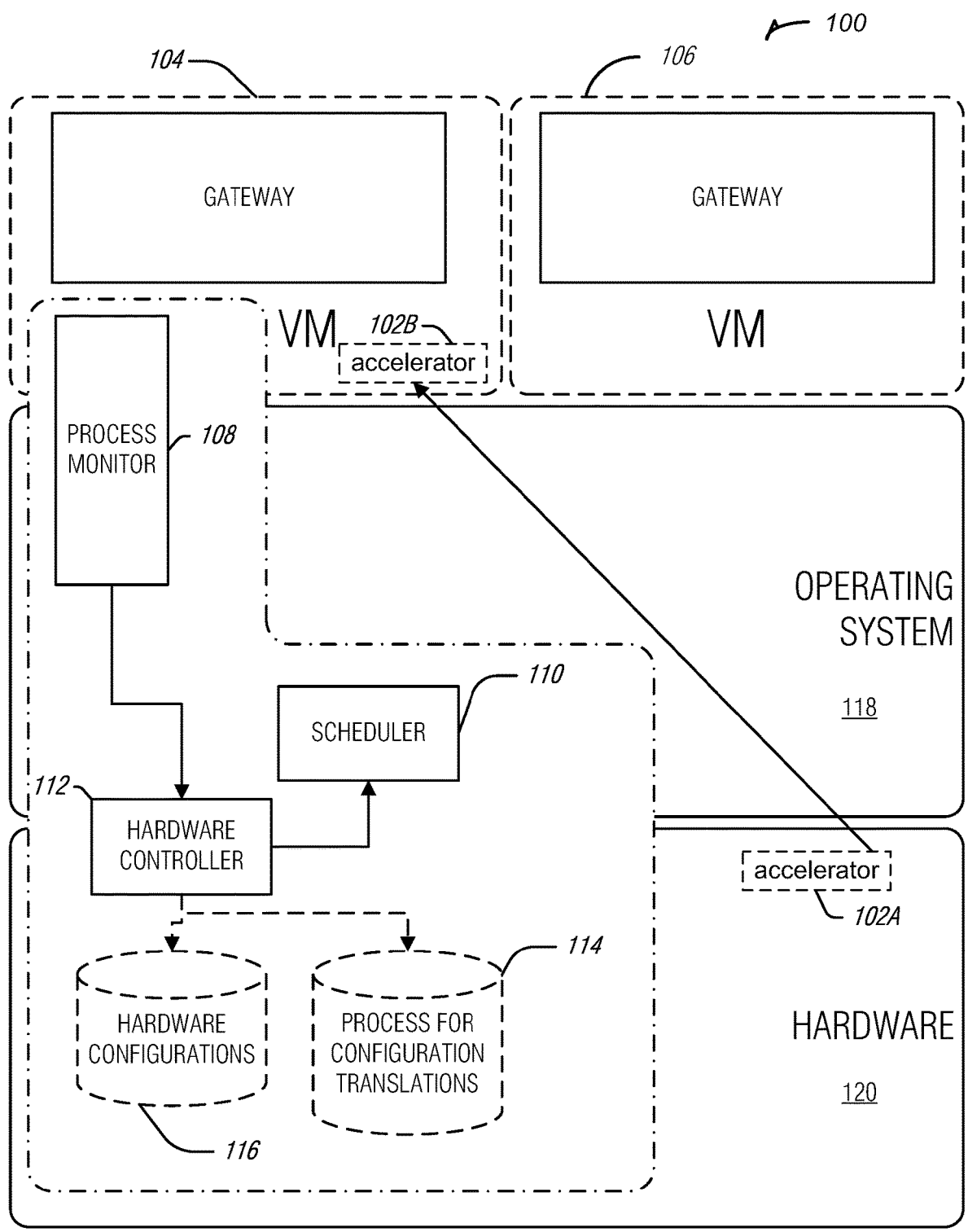
FIG. 1 illustrates a device including a hardware accelerator that may be assigned to a logical gateway virtual machine (VM).

FIG. 1 illustrates a device 100 including a hardware accelerator 102 in hardware 120 that may be assigned to a logical gateway virtual machine (VM) 104. As illustrated the hardware accelerator is initially unallocated 102A and then later allocated 102B to the VM 104. The device 100 may include a single VM or a plurality of VMs (e.g., VM 104, VM 106, etc.). Each VM may operate a gateway for a variety of IoT devices. The device 100 includes an operating system 118 and hardware 120 including one or more hardware accelerators (e.g., hardware accelerator 102) for different types of services or tasks, such as video processing, facial recognition, audio processing, or the like. The hardware accelerator 102 may be purpose-built (e.g., fixed-function, hardwired, etc.) or programmable logic (e.g., a field-programmable gate array (FPGA)).

The device 100 includes a process monitor 108 that may operate in the VM 104, the operating system 118, or the hardware 120. Other components of device 100 may be run on the VM 104, the operating system 118, or the hardware 120, including a scheduler 110, hardware controller 112, and optional hardware configurations 116 and process for configuration translations 114. In an example, the components of the system 100 are in a single enclosure. That is, the system 100 is not a cloud type architecture, nor composed of remotely connected components, but rather a more traditional hardware stack with a virtualization layer.

The process monitor 108 may identify a candidate task amenable to hardware optimization. In this example, the candidate task may operate in an operating environment (e.g., virtual machine or the gateway of the virtual machine). The hardware controller 112 may instantiate the hardware accelerator 102A in the VM 104, as shown by the accelerator 102B for the candidate task or tasks similar to the candidate task. The scheduler 110 may execute a class of tasks amenable to the hardware optimization (e.g., using the hardware accelerator 102B). For example, a first video processing (e.g., facial recognition) task may be initiated on the VM 104, originating from an IoT device and received through the gateway. The first video processing task may be identified by the process monitor 108 as a task that may be aided by the accelerator 102A. The hardware controller 112 may assign the accelerator 102A to the VM 104. The scheduler 110 may then execute a second video processing task (for example, if the first video processing task has already been completed) using the accelerator 102B assigned to the VM 104. Thus, in an example, a class of tasks are those tasks that may benefit from the same hardware accelerator 102.

Amenability of a task to hardware acceleration may be determined in a variety of ways. For example, the task may attempt to access a hardware interface specific to particular hardware acceleration. Generally, if the hardware acceleration is not available, the access will fail and the task may fall back on a general purpose processor solution. Thus, the request may be intercepted and matched (e.g., using the translations database 114) to a particular hardware accelerator. In an example, tasks may be tagged by a requesting protocol (e.g., in the IoT requesting protocol). Such tagging may be mapped (e.g., using the database 114) to specific hardware accelerators. In an example, specific instructions may be mapped to hardware acceleration devices. Thus, if such an instruction is initiated by a task, the task may be classified as amendable to hardware acceleration. If the mapping of the task, or an activity initiated by the task, to a hardware accelerator 102 on the hardware 120 is not found, then the task is not amendable to hardware acceleration.

The hardware controller 112 may access the hardware configurations 116 database to determine what resources are potentially available to the VM 104. In an example, the hardware configuration database 116 includes FPGA configurations. Thus, available FPGA resources may be specifically tailored to a hardware acceleration need of the VM 104. In this example, any resultant functionality of the FPGA provided by any configuration may be a discrete hardware accelerator available to the VM 104, and mappable to determine task amenability to hardware acceleration. In this manner, the flexibility of obtaining hardware acceleration for a variety of tasks may be increased without burdening the hardware 120 with many specialized components.

An example of the system 100 in operation may include a window shade IoT controller receiving a voice command to raise the shades. A microphone on the IoT device captures the command, but processing is offloaded to the gateway device, the system 100. The system 100 begins executing the task for the voice processing to extract the command from the user's utterance. As there are other IoT devices with voice commands in the same room, several of these requests come into the system 100 at the same time. The process monitor 108 observes that the processing resources of the VM 104 are taxed in dealing with these requests. The voice recognition tasks corresponding to the requests are identified by the process monitor 108 as causing the processing load. The process monitor 108 (or the hardware controller 112) also identify that these tasks are amendable to hardware acceleration. Once this determination is made, the hardware controller 112 allocates the unallocated accelerator 102A to the VM 104 without interrupting either the operating system 118 or the VM 104. As discussed above, the accelerator 102A may be an FPGA. In order to processing the voice recognition, the hardware controller 112 may obtain an FPGA configuration from the hardware configurations database 116 and program the accelerator 102A before allocating it as accelerator 102B to the VM 104. After the allocation, the scheduler 110 executes the voice recognition tasks to the accelerator 102B. In an example, the original task may have already executed prior to the allocation. However, the class of tasks that use the accelerator 102B are run with hardware acceleration by the scheduler. In this manner, the edge resources (e.g., gateways) may process a wider variety of IoT tasks in a more efficient manner without excessive or exotic hardware. The voice example is exemplary and other functionality may be dynamically accelerated with custom functionality. Other tasks that may be improved include things that might go into an ASIC or other custom hardware, such as for manipulating video, sensor, signals, or other data.

Figure 2:
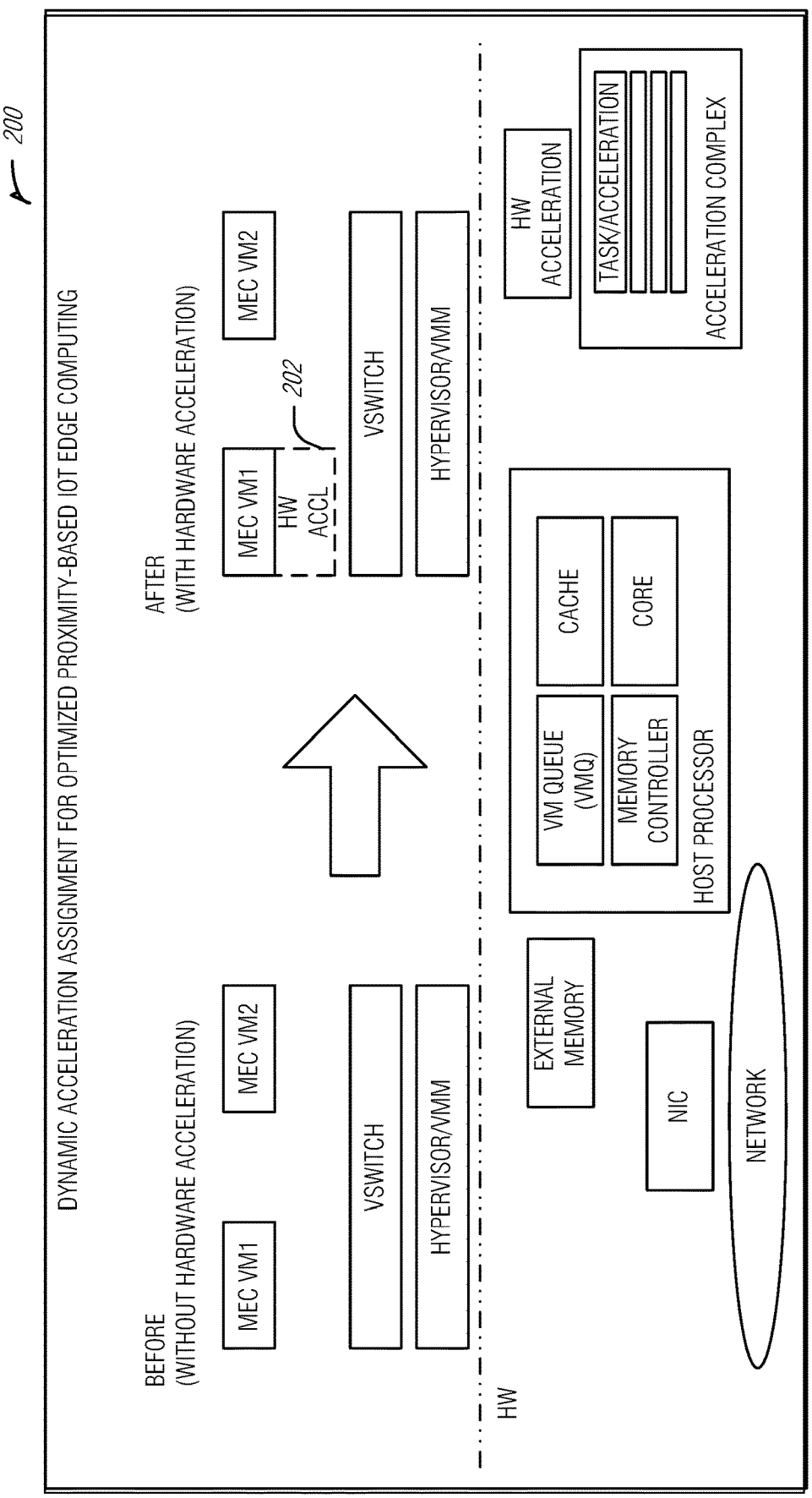
FIG. 2 illustrates an example of a transition of a device when being assigned a hardware element.

FIG. 2 illustrates an example of a transition of the device 100 when being assigned a hardware element. FIG. 2 includes a system 200 for optimizing MEC capabilities to Support IoT services with hardware acceleration. For example, the hardware accelerator 202 is added to the MEC VM1 after the system 200 is optimized for a specified task. In an example, adding the hardware accelerator 202 is in accord with the FIG. 1 discussion above relating to instantiating the hardware accelerator 102A in VM 104, and it will be appreciated that other techniques may be used to add, assign, or reassign the hardware accelerator 202. The system 200 shows a dynamic acceleration assignment for optimizing proximity-based IoT edge computing by adding the hardware accelerator 202 to the system 200. Other hardware may be included in system 200 including external memory, a NIC to access a network, a host processor including a VM queue, cache, memory controller, and core, hardware acceleration components, and an acceleration complex including task/acceleration components.

FIGS. 1 and 2 illustrate flexibility of hardware assignment within a single enclosure device, such as a gateway. However, situations may arise in which the local gateway does not have enough resources, or the right type of resources, to handle IoT requests. However, a hierarchical edge network topology and variety of hardware capabilities in the edge network devices may allow for tasks to be shifted to available or capable devices while still realizing the computational efficiency of edge computing over cloud computing.

Figure 3:
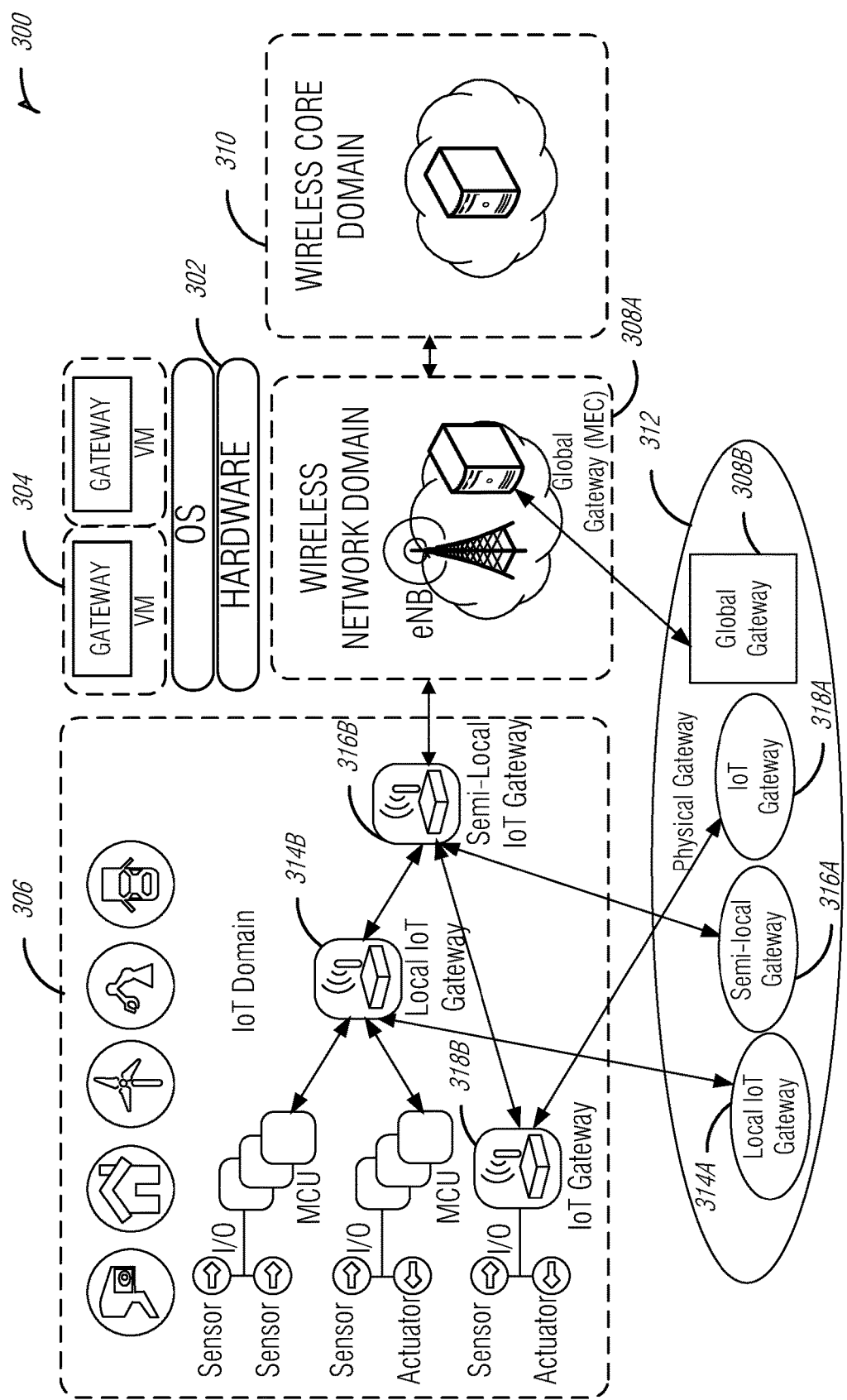
FIG. 3 illustrates an optimizing hierarchy of Mobile Edge Computing (MEC) and IoT gateways to support IoT services.

FIG. 3 illustrates an optimizing hierarchy system 300 of a MEC 308A and IoT gateways to support device services. In an example, the hierarchy system 300 minimizes latencies between a user device or IoT device and a processing device. A co-existence between the IoT gateways and MEC 308A presents an opportunity for video analytics, or other processing, in IoT. IoT gateways (e.g., the gateway on virtual machine 304) may play the role of video traffic aggregator from IoT cameras. An IoT gateway may process the video traffic or rely on other gateways in the hierarchy system 300 or the MEC that runs virtual IoT gateways for video processing (e.g. face recognition, computer vision, or the like). The IoT gateway (e.g., on VM 304) may use a hardware accelerator for the video processing, such as from hardware 302. IoT gateways may also use other gateways or the MEC for analytics, storage, and smart caching capabilities.

An IoT gateway may have a hierarchical deployment including a local gateway 314A directly connecting to IoT devices, connecting them within the same subnet, a semi-local gateway 316A directly connecting local gateways within the same subnet and acting as an aggregator to these gateways, and a global gateway 308A at the network wireless network edge collocated with a wireless AP or an enhanced node B (eNodeB). The IoT gateway 318A may be an aggregator to local (e.g., 314B) or semi-local (e.g., 316B) gateways or may communicate with IoT devices directly (e.g., 318B) depending on the communication capabilities of the IoT devices.

In an example, various types of gateways may be used in a system as an IoT gateway. For example, a physical gateway 312 includes a network device dedicated to the gateway role (e.g., global gateway 308B). In an example, this applies to local gateways (e.g. 314A) and semi-local gateways (e.g., 316A). Another type of gateway may include a co-existing gateway, such as a network device dedicated to operating the gateway role in terms of connectivity but co-existing with other devices (e.g., a micro-server) for processing, storage, or analytics. The co-existing gateway may apply to a local gateway, a semi-local gateway, or a global gateway. Yet another IoT gateway may include a logical gateway. The logical gateway may include a virtual device (e.g., a virtual machine running on a network device) implementing the gateway functionalities. The logical gateway may apply to global gateway, semi-local gateway, or a local gateway.

An IoT domain 306 may include one or more IoT gateways (e.g., IoT gateway 318B, local IoT gateway 314B, or semi-local IoT gateway 316B) that communicate with the global gateway 308A (e.g., a MEC). The global gateway 308A may communicate with an AP or and eNodeB in the wireless network domain, which in turn may communicate with the larger wireless core domain 310 or internet or other networks.

In an example, the system 300 includes a hardware acceleration device 302 available for assignment in a virtual environment, as is described above. The hardware acceleration device 302 may include a purpose-built hardware (e.g., hardwired) or programmable hardware (e.g., FPGA or the like) acceleration. The system 300 may assign the hardware acceleration 302 to an IoT service task or tasks (e.g., security, compression, media processing, or the like) to improve speed, functioning, power, or time spent over what a general CPU processor assigned to do the same task or tasks would require. In another example, the hardware acceleration may be assignable to virtual edge computing resources dynamically, such as without shutting down the existing system. In an example, a system for optimizing edge-based computing resources based on IoT services rendered, includes an edge compute virtual machine configured to handle proximity-located IoT computing needs. The system may include a processor to run a CPU utilization process and an offending task process. The a CPU utilization process may include determining overall CPU utilization of the edge compute virtual machine and the offending task process may include determining the task that utilizes most of the CPU of the edge compute virtual machine. The system may include various assignable (e.g., Single Root I/O Virtualization (SR-IOV)) hardware acceleration (e.g., purpose-built security, compression, or media acceleration; or programmable logic acceleration) available within the same server host that provisioned the Edge Compute virtual machine. The system may include an acceleration complex configured to determine which available hardware acceleration is available, and which hardware acceleration of those available, when assigned to the provisioned edge compute virtual machine, will result in a reduced overall CPU utilization, such as a reduction that results in a CPU utilization below a predetermined limit. Hardware acceleration may vary based on the workload needed. Examples of IoT services include web real-time communication (WebRTC) at a MEC server for managing video sessions between remote user IoT application and a smart space that may be remotely monitored by a user (e.g., in situations involving eHealth or for remote monitoring of patients). In another example, an IoT service may include face recognition, such as to identify people for security purposes.

Another IoT service may include a retail promotion, where the local gateway may track and send a user location to an upper gateway in the hierarchy (e.g., one that may be co-located with the MEC) to send coupons to users based on identity, location, or other user characteristics (e.g., through RFID identity of a smart phone, face recognition, user entered information, or the like). In an example, an IoT service may include an agriculture-based IoT service, such as for devices remotely monitoring farms in different areas. For example, the IoT gateway may send sensors data related to humidity, leakage, temperature, etc., to the MEC server and the analytics may be processed at the MEC to give trends or send alerts. In yet another example, augmented reality (e.g., sensor-based), may be an IoT service and the local gateway may send sensor information to the MEC and the MEC may run analytics and push videos appropriate to a user's location and context. Another augmented reality example may include a pull-mode by a user.

As noted above, while a given gateway may be optimized via dynamic hardware acceleration allocation, at times a given gateway which would generally service an IoT device (e.g., due to network proximity, low latency, load balancing, etc.) may not have an appropriate hardware accelerator available for a task. In these scenarios, the hierarchy of the gateway network may be used to balance both network efficiency and hardware availability. In an example, a local gateway may search neighboring local gateways for hardware availability. In an example, the search is tailored by a determination of the hardware accelerator a target task is amenable to using. In an example, the search involves the task request itself. In an example, the search progresses up the hierarchy, given preference to nodes located closer to the IoT requestor. In these examples, closeness may be physical closeness, or it may be measured in latency, bandwidth, or a combination of the two. In an example, cost (e.g., financial or otherwise) may be a consideration. For example, if the latency of borrowing from a neighbor device is less than the cost of keeping it local, the transfer may be made, otherwise it may be kept local. In an example, a hardware optimized process may be shifted off the local custom hardware and moved to a neighbor in favor of instantiating a more burdensome task locally.

Figure 4:
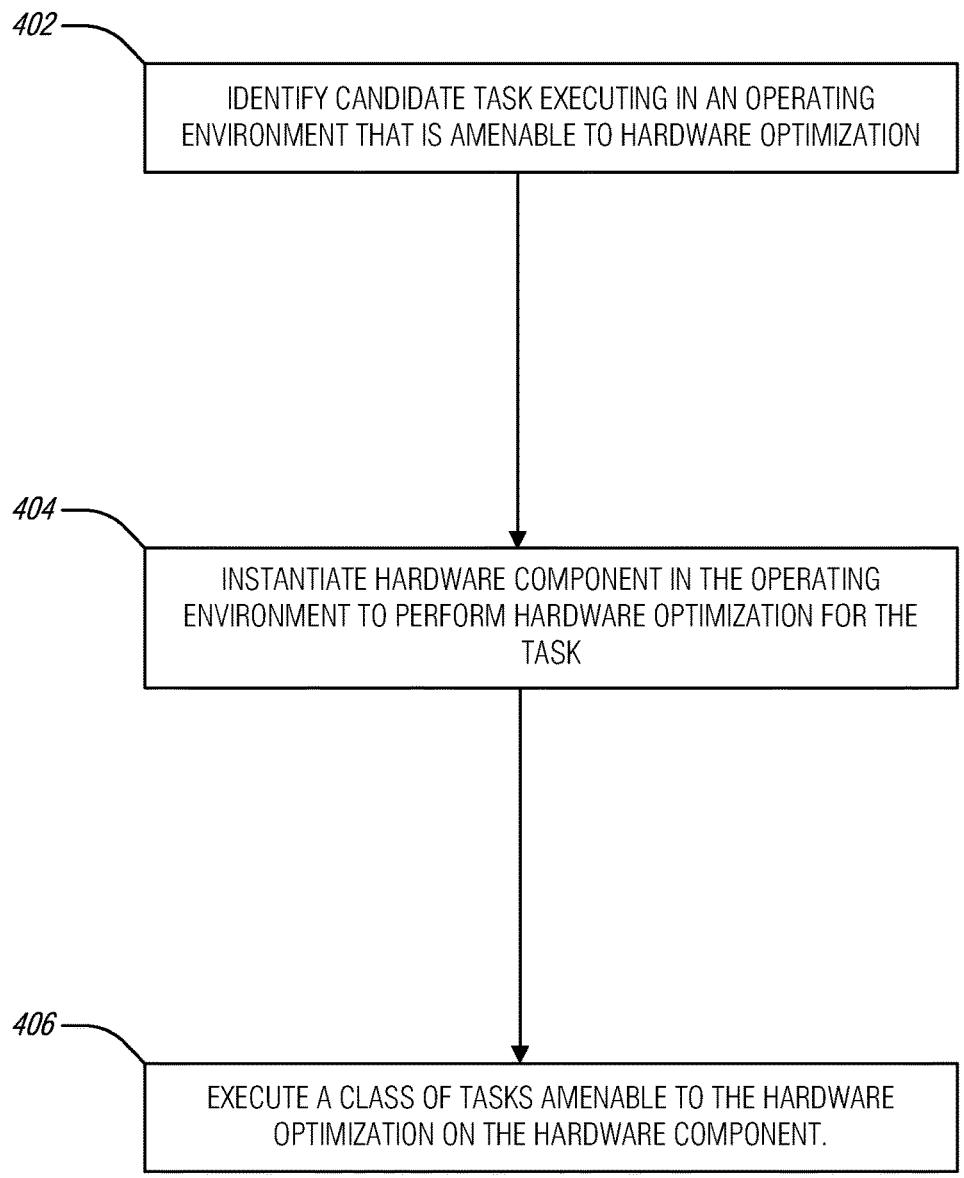
FIG. 4 illustrates a flowchart showing a technique for dynamic hardware acceleration in accordance with some embodiments.

FIG. 4 illustrates a flowchart showing a technique 400 for dynamic hardware acceleration in accordance with some embodiments. The technique 400 includes an operation 402 to identify a candidate task executing in an operating environment that is amenable to hardware optimization. For example, the candidate task may include a task or service from an IoT device and the operating environment may include a virtual machine of a system. The virtual machine may be one of a plurality of virtual machines in the system. Hardware optimizing may include assigning a hardware accelerator from hardware of the system to the virtual machine. The technique 400 includes an operation 404 to instantiate a hardware component in the operating environment to perform hardware optimization for the candidate task. The hardware component may include a hardware accelerator configured to optimize or improve a type of task corresponding to a type task of the candidate task. In an example, instantiating the hardware component includes starting an interface to the hardware component within the operating environment. Starting the interface may include allocating the hardware component to a virtual machine by a virtual machine monitor (VMM), and the operating environment may be the virtual machine. Allocating the hardware component may include not interrupting the operating environment from executing the plurality of tasks. In another example, instantiating the hardware may include finding a component configuration in a database that corresponds to the class of tasks and configuring the hardware component with the component configuration. The example may include allocating the configured hardware component to the operating environment. In an example, once the custom hardware has been programmed into a FPGA or otherwise instantiated in hardware, the device's state may be swapped in/out to facilitate multi-task sharing across different VMs that want to use that same device.

The technique 400 includes an operation 406 to execute a class of tasks amenable to the hardware optimization on the hardware component. The operating environment may implement an IoT gateway, such as on the virtual machine. The IoT gateway may include a MEC device.

The technique may include other operations, such as an operation to identify a second candidate task, failing to instantiate a second hardware component for a second class of tasks amenable to a same hardware optimization as the second candidate task, finding a second IoT service device in an IoT hierarchy (e.g., another IoT gateway, server, device, etc.), and transferring the second class of tasks to the second IoT service device. Finding the second IoT service device may include searching the hierarchy starting at an end of the hierarchy to which the operating environment (e.g., an IoT gateway) belongs and continuing towards the other end of the hierarchy. The technique may include an operation to identify the candidate task by measuring utilization of a processor and identifying the candidate task when the utilization exceeds a threshold. The task may include a service or a process. The hardware component may include a field programmable gate array (FPGA).

The technique may include determining if the candidate task is amenable to hardware optimization by attempting to use an interface of the operating environment that corresponds to a class of hardware components, such as hardware accelerators. In another example, the candidate task may be amenable to hardware optimization when a marker of the task includes a corresponding class of hardware components in a database. The marker may include a notification by a requesting device that initiated the candidate task (e.g., an IoT device), the notification identifying that the task is amenable to hardware optimization. The marker may include a set of instructions in the task, and the task may be amenable to hardware optimization when the set of instructions matches a ruleset.

Figure 5:
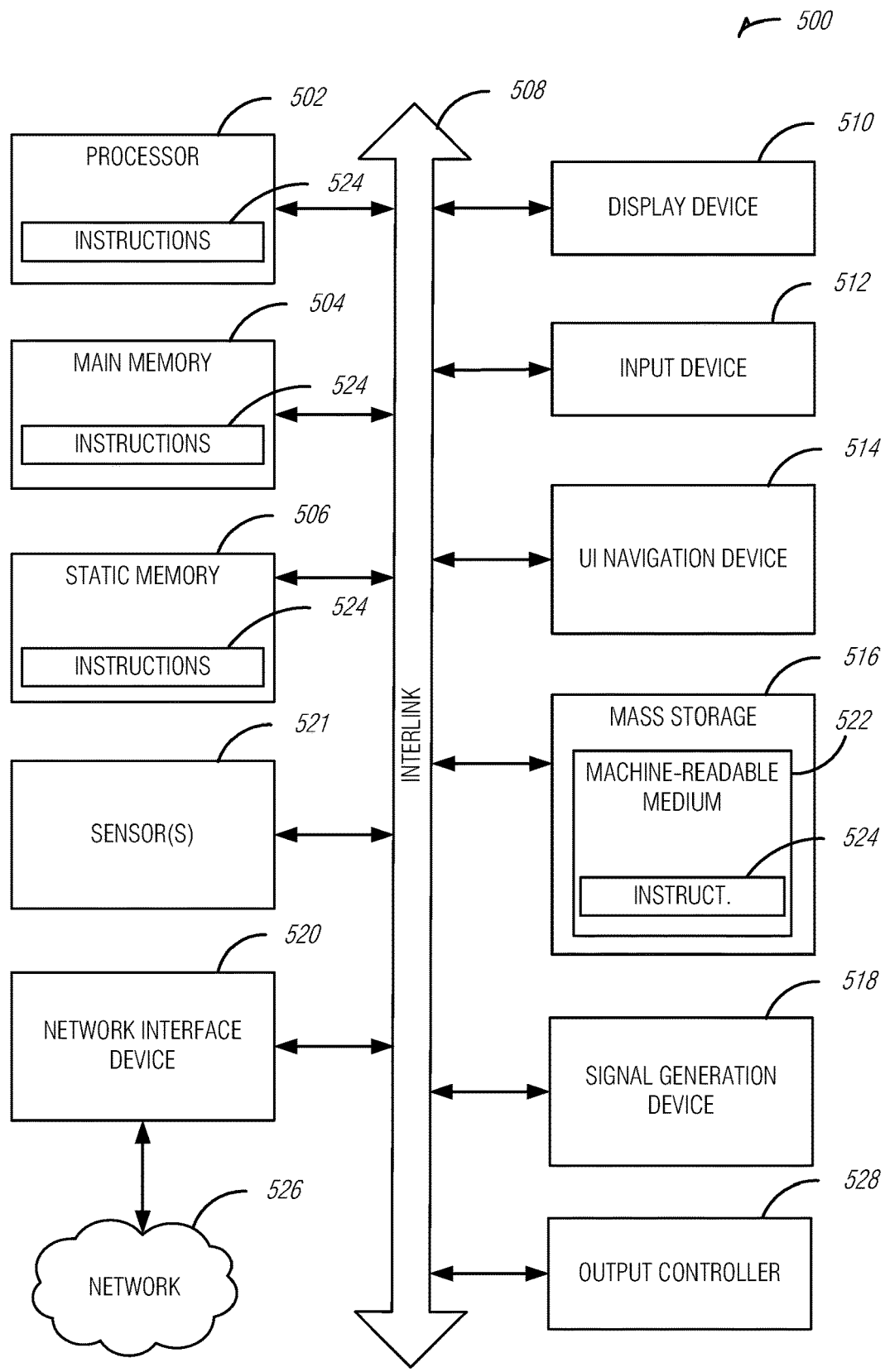
FIG. 5 illustrates generally an example of a block diagram of a machine upon which any one or more of the techniques (e.g., methodologies) discussed herein may perform in accordance with some embodiments.

FIG. 5 illustrates generally an example of a block diagram of a machine 900 upon which any one or more of the techniques (e.g., methodologies) discussed herein may perform in accordance with some embodiments. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, alphanumeric input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 that is non-transitory on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a system for dynamic hardware acceleration, the method comprising: a process monitor to identify a candidate task from a plurality of tasks executing in an operating environment, the operating environment within a hardware enclosure, the candidate task amenable to hardware optimization; a hardware controller to instantiate, in response to identifying the candidate task, a hardware component in the operating environment to perform hardware optimization for the task; and a scheduler to execute a class of tasks amenable to the hardware optimization on the hardware component.

In Example 2, the subject matter of Example 1 optionally includes, wherein the operating environment is a virtual machine of the hardware enclosure.

In Example 3, the subject matter of Example 2 optionally includes, wherein the virtual machine is one of a plurality of virtual machines of the hardware enclosure.

In Example 4, the subject matter of any one or more of Examples 1-3 optionally include, wherein the operating environment is an operating system.

In Example 5, the subject matter of any one or more of Examples 1-4 optionally include, wherein the operating environment implements an internet-of-things (IoT) gateway.

In Example 6, the subject matter of Example 5 optionally includes, wherein the IoT gateway is a mobile edge computing (MEC) device.

In Example 7, the subject matter of Example 6 optionally includes, wherein the candidate task is one of a plurality of tasks initiated by requests from an IoT device served by the IoT gateway.

In Example 8, the subject matter of any one or more of Examples 5-7 optionally include, wherein the IoT gateway is one of a plurality of IoT service devices serving an IoT device set.

In Example 9, the subject matter of Example 8 optionally includes, wherein the plurality of IoT service devices are arranged hierarchically with IoT gateways directly serving the IoT device set at one end of the hierarchy and network-edge servers at the other end of the hierarchy.

In Example 10, the subject matter of Example 9 optionally includes, wherein: the process monitor is to identify a second candidate task from the plurality of tasks; the hardware controller to fail to instantiate a second hardware component for a second class of tasks amenable to a same hardware optimization as the second candidate task; the scheduler to: find a second IoT service device in the hierarchy that can instantiate the hardware component; and transfer the second class of tasks to the second IoT service device.

In Example 11, the subject matter of Example 10 optionally includes, wherein to find the second IoT service device, the scheduler is to search the hierarchy starting at the end of the hierarchy to which the IoT gateway belongs and continue towards the other end of the hierarchy.

In Example 12, the subject matter of any one or more of Examples 1-11 optionally include, wherein to identify the candidate task, the process monitor is to: measure utilization of a processor; and identify the task when the utilization is beyond a threshold.

In Example 13, the subject matter of any one or more of Examples 1-12 optionally include, wherein the task is a process.

In Example 14, the subject matter of any one or more of Examples 1-13 optionally include, wherein the candidate task is amenable to hardware optimization when it attempts to use an interface of the operating environment that corresponds to a class of hardware components.

In Example 15, the subject matter of any one or more of Examples 1-14 optionally include, wherein the candidate task is amenable to hardware optimization when a marker of the task includes a corresponding class of hardware components in a database.

In Example 16, the subject matter of Example 15 optionally includes, wherein the marker is a notification by a requesting device that initiated the task, the notification identifying that the task is amenable to hardware optimization.

In Example 17, the subject matter of any one or more of Examples 15-16 optionally include, wherein the marker includes a set of instructions in the task, and wherein the task is amenable to hardware optimization when the set of instructions matches a ruleset.

In Example 18, the subject matter of any one or more of Examples 1-17 optionally include, wherein to instantiate the hardware component, the hardware controller is to start an interface to the hardware component within the operating environment.

In Example 19, the subject matter of Example 18 optionally includes, wherein to start the interface, the hardware controller is to allocate the hardware component to a virtual machine by a virtual machine monitor (VMM), the operating environment being the virtual machine.

In Example 20, the subject matter of Example 19 optionally includes, wherein to allocate the hardware component, the hardware controller does not interrupt the operating environment from executing the plurality of tasks.

In Example 21, the subject matter of any one or more of Examples 1-20 optionally include, wherein to instantiate the hardware component, the hardware controller is to: find a component configuration in a database that corresponds to the class of tasks; configure the hardware component with the component configuration; and allocate the configured hardware component to the operating environment.

In Example 22, the subject matter of Example 21 optionally includes, wherein the hardware component is a field programmable gate array (FPGA).

Example 23 is a method for dynamic hardware acceleration, the method comprising: identifying a candidate task from a plurality of tasks executing in an operating environment, the operating environment within a hardware enclosure, the candidate task amenable to hardware optimization; instantiating, in response to identifying the candidate task, a hardware component in the operating environment to perform hardware optimization for the task, the hardware component being previously inaccessible to the operating environment; and executing, by the operating environment, a class of tasks amenable to the hardware optimization on the hardware component.

In Example 24, the subject matter of Example 23 optionally includes, wherein the operating environment is a virtual machine of the hardware enclosure.

In Example 25, the subject matter of Example 24 optionally includes, wherein the virtual machine is one of a plurality of virtual machines of the hardware enclosure.

In Example 26, the subject matter of any one or more of Examples 23-25 optionally include, wherein the operating environment is an operating system.

In Example 27, the subject matter of any one or more of Examples 23-26 optionally include, wherein the operating environment implements an internet-of-things (IoT) gateway.

In Example 28, the subject matter of Example 27 optionally includes, wherein the IoT gateway is a mobile edge computing (MEC) device.

In Example 29, the subject matter of Example 28 optionally includes, wherein the candidate task is one of a plurality of tasks initiated by requests from an IoT device served by the IoT gateway.

In Example 30, the subject matter of any one or more of Examples 27-29 optionally include, wherein the IoT gateway is one of a plurality of IoT service devices serving an IoT device set.

In Example 31, the subject matter of Example 30 optionally includes, wherein the plurality of IoT service devices are arranged hierarchically with IoT gateways directly serving the IoT device set at one end of the hierarchy and network-edge servers at the other end of the hierarchy.

In Example 32, the subject matter of Example 31 optionally includes: identifying a second candidate task from the plurality of tasks; failing to instantiate a second hardware component for a second class of tasks amenable to a same hardware optimization as the second candidate task; finding a second IoT service device in the hierarchy that can instantiate the hardware component; and transferring the second class of tasks to the second IoT service device.

In Example 33, the subject matter of Example 32 optionally includes, wherein finding the second IoT service device includes searching the hierarchy starting at the end of the hierarchy to which the IoT gateway belongs and continuing towards the other end of the hierarchy.

In Example 34, the subject matter of any one or more of Examples 23-33 optionally include, wherein identifying the candidate task includes: measuring utilization of a processor; and identifying the task when the utilization is beyond a threshold.

In Example 35, the subject matter of any one or more of Examples 23-34 optionally include, wherein the task is a process.

In Example 36, the subject matter of any one or more of Examples 23-35 optionally include, wherein the candidate task is amenable to hardware optimization when it attempts to use an interface of the operating environment that corresponds to a class of hardware components.

In Example 37, the subject matter of any one or more of Examples 23-36 optionally include, wherein the candidate task is amenable to hardware optimization when a marker of the task includes a corresponding class of hardware components in a database.

In Example 38, the subject matter of Example 37 optionally includes, wherein the marker is a notification by a requesting device that initiated the task, the notification identifying that the task is amenable to hardware optimization.

In Example 39, the subject matter of any one or more of Examples 37-38 optionally include, wherein the marker includes a set of instructions in the task, and wherein the task is amenable to hardware optimization when the set of instructions matches a ruleset.

In Example 40, the subject matter of any one or more of Examples 23-39 optionally include, wherein instantiating the hardware component includes starting an interface to the hardware component within the operating environment.

In Example 41, the subject matter of Example 40 optionally includes, wherein starting the interface includes allocating the hardware component to a virtual machine by a virtual machine monitor (VMM), the operating environment being the virtual machine.

In Example 42, the subject matter of Example 41 optionally includes, wherein allocating the hardware component does not interrupt the operating environment from executing the plurality of tasks.

In Example 43, the subject matter of any one or more of Examples 23-42 optionally include, wherein instantiating the hardware component includes: finding a component configuration in a database that corresponds to the class of tasks; configuring the hardware component with the component configuration; and allocating the configured hardware component to the operating environment.

In Example 44, the subject matter of Example 43 optionally includes, wherein the hardware component is a field programmable gate array (FPGA).

In Example 45, the subject matter of any one or more of Examples 23-44 optionally include-M15.

In Example 46, the subject matter of any one or more of Examples 23-45 optionally include-M15.

Example 47 is at least one machine readable medium including instructions that, when executed, cause the machine to perform operations for dynamic hardware acceleration, the operations comprising: identifying a candidate task from a plurality of tasks executing in an operating environment, the operating environment within a hardware enclosure, the candidate task amenable to hardware optimization; instantiating, in response to identifying the candidate task, a hardware component in the operating environment to perform hardware optimization for the task, the hardware component being previously inaccessible to the operating environment; and executing, by the operating environment, a class of tasks amenable to the hardware optimization on the hardware component.

In Example 48, the subject matter of Example 47 optionally includes, wherein the operating environment is a virtual machine of the hardware enclosure.

In Example 49, the subject matter of Example 48 optionally includes, wherein the virtual machine is one of a plurality of virtual machines of the hardware enclosure.

In Example 50, the subject matter of any one or more of Examples 47-49 optionally include, wherein the operating environment is an operating system.

In Example 51, the subject matter of any one or more of Examples 47-50 optionally include, wherein the operating environment implements an internet-of-things (IoT) gateway.

In Example 52, the subject matter of Example 51 optionally includes, wherein the IoT gateway is a mobile edge computing (MEC) device.

In Example 53, the subject matter of Example 52 optionally includes, wherein the candidate task is one of a plurality of tasks initiated by requests from an IoT device served by the IoT gateway.

In Example 54, the subject matter of any one or more of Examples 51-53 optionally include, wherein the IoT gateway is one of a plurality of IoT service devices serving an IoT device set.

In Example 55, the subject matter of Example 54 optionally includes, wherein the plurality of IoT service devices are arranged hierarchically with IoT gateways directly serving the IoT device set at one end of the hierarchy and network-edge servers at the other end of the hierarchy.

In Example 56, the subject matter of Example 55 optionally includes: identifying a second candidate task from the plurality of tasks; failing to instantiate a second hardware component for a second class of tasks amenable to a same hardware optimization as the second candidate task; finding a second IoT service device in the hierarchy that can instantiate the hardware component; and transferring the second class of tasks to the second IoT service device.

In Example 57, the subject matter of Example 56 optionally includes, wherein finding the second IoT service device includes searching the hierarchy starting at the end of the hierarchy to which the IoT gateway belongs and continuing towards the other end of the hierarchy.

In Example 58, the subject matter of any one or more of Examples 47-57 optionally include, wherein identifying the candidate task includes: measuring utilization of a processor; and identifying the task when the utilization is beyond a threshold.

In Example 59, the subject matter of any one or more of Examples 47-58 optionally include, wherein the task is a process.

In Example 60, the subject matter of any one or more of Examples 47-59 optionally include, wherein the candidate task is amenable to hardware optimization when it attempts to use an interface of the operating environment that corresponds to a class of hardware components.

In Example 61, the subject matter of any one or more of Examples 47-60 optionally include, wherein the candidate task is amenable to hardware optimization when a marker of the task includes a corresponding class of hardware components in a database.

In Example 62, the subject matter of Example 61 optionally includes, wherein the marker is a notification by a requesting device that initiated the task, the notification identifying that the task is amenable to hardware optimization.

In Example 63, the subject matter of any one or more of Examples 61-62 optionally include, wherein the marker includes a set of instructions in the task, and wherein the task is amenable to hardware optimization when the set of instructions matches a ruleset.

In Example 64, the subject matter of any one or more of Examples 47-63 optionally include, wherein instantiating the hardware component includes starting an interface to the hardware component within the operating environment.

In Example 65, the subject matter of Example 64 optionally includes, wherein starting the interface includes allocating the hardware component to a virtual machine by a virtual machine monitor (VMM), the operating environment being the virtual machine.

In Example 66, the subject matter of Example 65 optionally includes, wherein allocating the hardware component does not interrupt the operating environment from executing the plurality of tasks.

In Example 67, the subject matter of any one or more of Examples 47-66 optionally include, wherein instantiating the hardware component includes: finding a component configuration in a database that corresponds to the class of tasks; configuring the hardware component with the component configuration; and allocating the configured hardware component to the operating environment.

In Example 68, the subject matter of Example 67 optionally includes, wherein the hardware component is a field programmable gate array (FPGA).

Example 69 is a system for dynamic hardware acceleration, the system comprising: means for identifying a candidate task from a plurality of tasks executing in an operating environment, the operating environment within a hardware enclosure, the candidate task amenable to hardware optimization; means for instantiating, in response to identifying the candidate task, a hardware component in the operating environment to perform hardware optimization for the task, the hardware component being previously inaccessible to the operating environment; and means for executing, by the operating environment, a class of tasks amenable to the hardware optimization on the hardware component.

In Example 70, the subject matter of Example 69 optionally includes, wherein the operating environment is a virtual machine of the hardware enclosure.

In Example 71, the subject matter of Example 70 optionally includes, wherein the virtual machine is one of a plurality of virtual machines of the hardware enclosure.

In Example 72, the subject matter of any one or more of Examples 69-71 optionally include, wherein the operating environment is an operating system.

In Example 73, the subject matter of any one or more of Examples 69-72 optionally include, wherein the operating environment implements an internet-of-things (IoT) gateway.

In Example 74, the subject matter of Example 73 optionally includes, wherein the IoT gateway is a mobile edge computing (MEC) device.

In Example 75, the subject matter of Example 74 optionally includes, wherein the candidate task is one of a plurality of tasks initiated by requests from an IoT device served by the IoT gateway.

In Example 76, the subject matter of any one or more of Examples 73-75 optionally include, wherein the IoT gateway is one of a plurality of IoT service devices serving an IoT device set.

In Example 77, the subject matter of Example 76 optionally includes, wherein the plurality of IoT service devices are arranged hierarchically with IoT gateways directly serving the IoT device set at one end of the hierarchy and network-edge servers at the other end of the hierarchy.

In Example 78, the subject matter of Example 77 optionally includes: means for identifying a second candidate task from the plurality of tasks; means for failing to instantiate a second hardware component for a second class of tasks amenable to a same hardware optimization as the second candidate task; means for finding a second IoT service device in the hierarchy that can instantiate the hardware component; and means for transferring the second class of tasks to the second IoT service device.

In Example 79, the subject matter of Example 78 optionally includes, wherein finding the second IoT service device includes searching the hierarchy starting at the end of the hierarchy to which the IoT gateway belongs and continuing towards the other end of the hierarchy.

In Example 80, the subject matter of any one or more of Examples 69-79 optionally include, wherein identifying the candidate task includes: means for measuring utilization of a processor; and means for identifying the task when the utilization is beyond a threshold.

In Example 81, the subject matter of any one or more of Examples 69-80 optionally include, wherein the task is a process.

In Example 82, the subject matter of any one or more of Examples 69-81 optionally include, wherein the candidate task is amenable to hardware optimization when it attempts to use an interface of the operating environment that corresponds to a class of hardware components.

In Example 83, the subject matter of any one or more of Examples 69-82 optionally include, wherein the candidate task is amenable to hardware optimization when a marker of the task includes a corresponding class of hardware components in a database.

In Example 84, the subject matter of Example 83 optionally includes, wherein the marker is a notification by a requesting device that initiated the task, the notification identifying that the task is amenable to hardware optimization.

In Example 85, the subject matter of any one or more of Examples 83-84 optionally include, wherein the marker includes a set of instructions in the task, and wherein the task is amenable to hardware optimization when the set of instructions matches a ruleset.

In Example 86, the subject matter of any one or more of Examples 69-85 optionally include, wherein instantiating the hardware component includes starting an interface to the hardware component within the operating environment.

In Example 87, the subject matter of Example 86 optionally includes, wherein starting the interface includes allocating the hardware component to a virtual machine by a virtual machine monitor (VMM), the operating environment being the virtual machine.

In Example 88, the subject matter of Example 87 optionally includes, wherein allocating the hardware component does not interrupt the operating environment from executing the plurality of tasks.

In Example 89, the subject matter of any one or more of Examples 69-88 optionally include, wherein instantiating the hardware component includes: means for finding a component configuration in a database that corresponds to the class of tasks; means for configuring the hardware component with the component configuration; and means for allocating the configured hardware component to the operating environment.

In Example 90, the subject matter of Example 89 optionally includes, wherein the hardware component is a field programmable gate array (FPGA).

In Example 91, the subject matter of any one or more of Examples 69-90 optionally include-MF15.

In Example 92, the subject matter of any one or more of Examples 69-91 optionally include-MF15.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system, in an internet-of-things (IoT) gateway, for dynamic hardware acceleration, the system comprising:
a process monitor to identify a first candidate task and a second candidate task from a plurality of tasks executing in the IoT gateway, the first candidate task and the second candidate task being different classes of tasks amenable to a same hardware optimization, the IoT gateway within a hardware enclosure, wherein the IoT gateway is part of a hierarchy of IoT gateways, wherein IoT gateways directly serving IoT devices are placed at a bottom of the hierarchy, IoT gateways serving and served by other IoT gateways are placed in a middle of the hierarchy, and IoT gateways served by a network-edge server are at a top of the hierarchy;
a hardware controller to:
instantiate, in response to identifying the first candidate task, a hardware component to perform hardware optimization for a first class of tasks corresponding to the first candidate task;
fail to instantiate, in response to identifying the second candidate task, the hardware component for a second class of tasks corresponding to the second candidate task because the hardware component is already instantiated for the first class of tasks corresponding to the first candidate task; and a scheduler, while the hardware component is instantiated for the class of tasks to:
    execute tasks corresponding to the first class of tasks;
    find a different IoT gateway connected to the IoT gateway in the hierarchy that can instantiate at least one hardware component for the second class of tasks; and
    transfer tasks corresponding to the second class of tasks, including the second candidate task, to the different IoT gateway.

2. The system of claim 1, wherein to identify the first candidate task, the process monitor is to:
    measure utilization of a processor; and
    identify the first candidate task when the utilization is beyond a threshold.

3. The system of claim 1, wherein the first candidate task is amenable to hardware optimization when a marker of the first candidate task includes a corresponding class of hardware components in a database.

4. The system of claim 1, wherein to instantiate the hardware component, the hardware controller is to:
    find a component configuration in a database that corresponds to the first class of tasks;
    configure the hardware component with the component configuration; and
    allocate the configured hardware component to the IoT gateway.

5. A method for dynamic hardware acceleration, the method performed by an internet-of-things (IoT) gateway, the method comprising:
    identifying a first candidate task and a second candidate task from a plurality of tasks executing in the IoT gateway, the first candidate task and the second candidate task being different classes of tasks amenable to a same hardware optimization, the IoT gateway within a hardware enclosure, wherein the IoT gateway is part of a hierarchy of IoT gateways, wherein IoT gateways serving IoT devices are placed at a bottom of the hierarchy, IoT gateways serving and served by other IoT gateways are placed in a middle of the hierarchy, and IoT gateways served by a network-edge server are at a top of the hierarchy;
    instantiating, in response to identifying the first candidate task, a hardware component to perform hardware optimization for a first class of tasks corresponding to the first candidate;
    executing tasks corresponding to the first class of tasks while the hardware component is instantiated for the first class of tasks;
    failing, in response to identifying the second candidate task, to instantiate the hardware component for the second class while the hardware component is instantiated for the first class of tasks;
    finding a different IoT gateway connected to the IoT gateway in the hierarchy that can instantiate at least one hardware component for the second class of tasks; and
    transferring tasks corresponding to the second class of tasks, including the second candidate task, to the different IoT gateway.

6. The method of claim 5, wherein identifying the candidate task includes:
    measuring utilization of a processor; and
    identifying the first candidate task when the utilization is beyond a threshold.

7. The method of claim 5, wherein the first candidate task is amenable to hardware optimization when a marker of the first candidate task includes a corresponding class of hardware components in a database.

8. The method of claim 5, wherein instantiating the hardware component includes:
    finding a component configuration in a database that corresponds to the first class of tasks;
    configuring the hardware component with the component configuration; and
    allocating the configured hardware component to the IoT gateway.

9. At least one non-transitory machine readable medium including instructions that, when executed, cause an internet-of-things (IoT) gateway to perform operations for dynamic hardware acceleration, the operations comprising:
    identifying a first candidate task and a second candidate task from a plurality of tasks executing in the IoT gateway, the first candidate task and the second candidate task being different classes of tasks amenable to a same hardware optimization, the IoT gateway within a hardware enclosure, wherein the IoT gateway is part of a hierarchy of IoT gateways, wherein IoT gateways serving IoT devices are placed at a bottom of the hierarchy, IoT gateways serving and served by other IoT gateways are placed in a middle of the hierarchy, and IoT gateways served by a network-edge server are at a top of the hierarchy;
    instantiating, in response to identifying the first candidate task, a hardware component to perform hardware optimization for a first class of tasks corresponding to the first candidate task;
    executing tasks corresponding to the first class of tasks while the hardware component is instantiated for the first class of tasks;
    failing, in response to identifying the second candidate task, to instantiate the hardware component for the second class while the hardware component is instantiated for the first class of tasks;
    finding a different IoT gateway connected to the IoT gateway in the hierarchy that can instantiate at least one hardware component for the second class of tasks; and
    transferring tasks corresponding to the second class of tasks, including the second candidate task, to the different IoT gateway.

10. The at least one non-transitory machine readable medium of claim 9, wherein identifying the candidate task includes:
    measuring utilization of a processor; and
    identifying the first candidate task when the utilization is beyond a threshold.

11. The at least one non-transitory machine readable medium of claim 9, wherein the first candidate task is amenable to hardware optimization when a marker of the first candidate task includes a corresponding class of hardware components in a database.

12. The at least one non-transitory machine readable medium of claim 9, wherein instantiating the hardware component includes:
    finding a component configuration in a database that corresponds to the first class of tasks;
    configuring the hardware component with the component configuration; and
    allocating the configured hardware component to the IoT gateway.

* * * * *

UNITED STATES PATENT AND TRADEMARK OFFICE
CERTIFICATE OF CORRECTION

PATENT NO. : 10,929,189 B2  
APPLICATION NO. : 15/754517  
DATED : February 23, 2021  
INVENTOR(S) : Palermo et al.

Page 1 of 1

It is certified that error appears in the above-identified patent and that said Letters Patent is hereby corrected as shown below:

In the Claims

Column 16, Line 49, Claim 1, delete "loT" and insert --IoT-- therefor

Column 17, Line 4, Claim 1, after "the", insert --first--

Column 17, Line 48, Claim 5, delete "candidate;" and insert --candidate task;-- therefor Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*